(12) United States Patent
Jin et al.

(10) Patent No.: US 10,482,617 B2
(45) Date of Patent: Nov. 19, 2019

(54) DISTANCE ESTIMATION METHOD BASED ON HANDHELD LIGHT FIELD CAMERA

(71) Applicant: Graduate School at Shenzhen, Tsinghua University, Shenzhen, Guangdong (CN)

(72) Inventors: Xin Jin, Guangdong (CN); Yanqin Chen, Guangdong (CN); Qionghai Dai, Guangdong (CN)

(73) Assignee: Graduate School at Shenzhen, Tsinghua University, Shenzhen, Guangdong (CN)

( * ) Notice: Subject to any disclaimer, the term of this patent is extended or adjusted under 35 U.S.C. 154(b) by 0 days.

(21) Appl. No.: 16/212,344

(22) Filed: Dec. 6, 2018

(65) Prior Publication Data

US 2019/0114796 A1 Apr. 18, 2019

Related U.S. Application Data

(63) Continuation of application No. PCT/CN2017/096573, filed on Aug. 9, 2017.

(30) Foreign Application Priority Data

Sep. 18, 2016 (CN) .................. 2016 1 08285588

(51) Int. Cl.
*G06T 7/557* (2017.01)
*H04N 5/225* (2006.01)
*G06T 7/80* (2017.01)

(52) U.S. Cl.
CPC ............... *G06T 7/557* (2017.01); *G06T 7/80* (2017.01); *H04N 5/22541* (2018.08); *G06T 2207/10052* (2013.01)

(58) Field of Classification Search
CPC . G06T 7/557; G06T 7/80; G06T 2207/10052; H04N 5/22541
See application file for complete search history.

(56) References Cited

U.S. PATENT DOCUMENTS

2009/0295829 A1 12/2009 Georgiev et al.
2017/0085832 A1* 3/2017 Drazic ................. H04N 5/9201

FOREIGN PATENT DOCUMENTS

CN 103209307 A 7/2013
CN 104050662 A 9/2014
(Continued)

OTHER PUBLICATIONS

Chen, et al.; "Distance measurement based on light field geometry and ray tracing", Optics Express vol. 25, Issue 1, pp. 59-76, Jan. 9, 2017.
(Continued)

*Primary Examiner* — Huy T Nguyen
(74) *Attorney, Agent, or Firm* — Hamre, Schumann, Mueller & Larson, P.C.

(57) ABSTRACT

A distance estimation method based on a handheld light field camera is disclosed and includes: S1: extracting parameters of the light field camera; S2: setting a reference plane and a calibration point; S3: refocusing a collected light field image on the reference plane, to obtain a distance between a main lens and a microlens array of the light field camera, and recording an imaging diameter of the calibration point on the refocused image; and S4: inputting the parameters of the light field camera, the distance between the main lens and the microlens array, and the imaging diameter of the calibration point on the refocused image to a light propagation mathematical model, and outputting a distance of the calibration point. The present application has high efficiency and relatively high accuracy.

7 Claims, 3 Drawing Sheets

(56) References Cited

FOREIGN PATENT DOCUMENTS

| CN | 105551050 A | 5/2016 |
|---|---|---|
| CN | 106373152 A | 2/2017 |

OTHER PUBLICATIONS

Hahne, et al.; "Light field geometry of a standard plenoptic camera", Optics Express vol. 22, Issue 22, pp. 26659-26673, published Oct. 21, 2014.
Dansereau, et al.; "Decoding, Calibration and Rectification for Lenselet-Based Plenoptic Cameras", Published in: 2013 IEEE Conference on Computer Vision and Pattern Recognition, Oct. 3, 2013, Electronic ISBN: 978-0-7695-4989-7, 8 pages.
Zang et al.; "Calibration and imaging model of light field camera with microlens array", ACTA Optica Sinica, vol. 34, No. 12, Dec. 2014, with English abstract, 13 pages.
Zang et al.; "Survey on Imaging Model and Calibration of Light Field Camera", Chinese Journal of Lasers, Jun. 2016, vol. 43, No. 6, with English abstract, 12 pages.
Office Action issued in corresponding Chinese Application No. 201610828558.8 on Jul. 3, 2018, with English translation.
International Search Report (English and Chinese) and Written Opinion issued in PCT/CN2017/096573 on Oct. 30, 2017, 9 pages.

\* cited by examiner

DISTANCE ESTIMATION METHOD BASED ON HANDHELD LIGHT FIELD CAMERA

CROSS REFERENCE TO RELATED APPLICATIONS

This application is a continuation application of PCT/CN2017/096573, filed on Aug. 9, 2017. The contents of PCT/CN2017/096573 are all hereby incorporated by reference.

BACKGROUND OF THE APPLICATION

Field of the Invention

The present application relates to the fields of computer vision and digital image processing, and in particular, to a distance estimation method based on a handheld light field camera.

Related Arts

Applications of a light field camera in the computer vision field attract much attention of researchers. The light field camera records position and direction information of an object by inserting a microlens array between a main lens and a sensor of a conventional camera. A single original light field image shot by using the light field camera not only can implement digital refocusing, view synthesis, and extended depth of field, but also can perform depth estimation on a scene on an image by using related processing algorithms.

Researchers have provided a lot of depth estimation methods for a light field image, which are roughly classified into two types: a depth estimation method based on a single clue and a depth estimation method based on multi-clue fusion. In the depth estimation method based on a single clue, a stereo matching principle is mainly used to obtain a single clue for depth estimation by searching for a corresponding area of an extracted sub-aperture image and analyzing a correlation thereof. In the depth estimation method based on multi-clue fusion, multiple clues related to a depth are extracted from light field image data and are effectively fused to estimate the depth, for example, two clues, that is, the consistency and the defocus degree of the sub-aperture image are fused. However, because the baseline of the light field camera is small and the resolution of the sub-aperture image is low, only a low-precision depth image can be obtained by using the foregoing two types of algorithms, and the high complexity of the algorithms causes low efficiency of the depth estimation.

The disclosure of the content of the foregoing background is only used to help understand the idea and the technical solutions of the present application, but does not necessarily belong to the prior art of this patent application. When there is no clear evidence indicating that the foregoing content has been disclosed on the application date of this patent application, the foregoing background shall not be used to evaluate the novelty and the creativity of this application.

SUMMARY OF THE INVENTION

To resolve the foregoing technical problem, the present application provides a distance estimation method based on a handheld light field camera, and has high efficiency and relatively high accuracy.

To achieve the foregoing objective, the present application uses the following technical solutions:

The present application discloses a distance estimation method based on a handheld light field camera, including the following steps:

S1: extracting parameters of a light field camera, including a focal length, a curvature radius, a pupil diameter, and a central thickness of a main lens of the light field camera, and a focal length of a microlens array of the light field camera;

S2: setting a reference plane and a calibration point, where the calibration point is set on an object whose distance needs to be estimated, and obtaining a distance between the reference plane and the main lens;

S3: refocusing a collected light field image on the reference plane, to obtain a distance between the main lens and the microlens array of the light field camera, and recording an imaging diameter of the calibration point on the refocused image; and S4: inputting the parameters of the light field camera that are extracted in step S1, the distance between the main lens and the microlens array that is obtained in step S3, and the recorded imaging diameter of the calibration point on the refocused image that is recorded in step S3 to a light propagation mathematical model, and outputting a distance of the calibration point.

Preferably, the reference plane and the calibration point set in step S2 do not obstruct each other, and the calibration point does not overlap when being imaged.

Preferably, step S3 specifically includes refocusing the collected light field image on the reference plane by using the following formula:

$$L_z[y_j] = \sum_{i=-c}^{c} L[v_{m-1-c+i}, y_{j+a(c-i)}], a \in R_+, \quad (1)$$

where L denotes the light field image, $L_z$ denotes the refocused image on the reference plane z, a denotes a specific value corresponding to a focusing plane of an object space, that is, a specific value corresponding to the reference plane z in this step; y={x,y} denotes position information of the light field image, v={u,v} denotes direction information of the light field image, the subscript m denotes the number of pixels of each microlens in a one-dimensional direction, c=(m−1)/2, i is an integer with a value range of [−c,c], and the subscript j denotes coordinates of the microlens in a vertical direction.

Preferably, the step of obtaining a distance between the main lens and the microlens array in step S3 specifically includes:

using a ray tracing method to obtain a coordinate calculation formula of intersections on a plane $F_u$:

$$F_i = m_i \times f \quad (2),$$

where the distance between the intersections on the plane $F_u$ is the baseline of the light field camera, f is the focal length of the main lens, and $m_i$ is the slope of a light ray between a sensor and the main lens of the light field camera;

a calculation formula of the slope $k_i$ of a light ray emitted from the object in an object space is:

$$k_i = \frac{y'_j - F_i}{d_{out} - f}, \quad (3)$$

where $y_j'$ denotes a vertical coordinate of the object on the reference plane, and $d_{out}$ denotes the distance between the reference plane and the main lens; and obtaining, through calculation according to the formula (3), an incident position and an emergent position (p',q') of the main lens that are reached by the light ray emitted from the object, and obtaining, through calculation according to the emergent position (p',q') the distance $d_{in}$ between the main lens and the microlens array:

$$d_{in} = \frac{q' - y_j + m_i p'}{m_i}, \quad (4)$$

where $y_j$ denotes a vertical coordinate of the center of the microlens whose subscript is j.

Preferably, the light propagation mathematical model in step S4 specifically includes a light propagation incident part and a light propagation emergent part.

Preferably, a propagation mathematical model of the light propagation incident part specifically includes:

the light ray emitted from the calibration point enters the main lens at an angle φ, where φ meets the relational expression:

$$\tan\varphi = \frac{D}{2\left(d_{out}' - T/2 + R - \sqrt{R^2 - D^2/4}\right)}, \quad (5)$$

where $d_{out}'$ denotes an axial distance between the calibration point and the center of the main lens, R denotes the curvature radius of the main lens, D denotes the pupil radius of the main lens, T denotes the central thickness of the main lens, and the light ray emitted from the calibration point is refracted after entering the main lens, and the following formula is met:

$$n_1 \sin\psi = \sin(\varphi + \theta_1) \quad (6),$$

where $n_1$ denotes a refractive index of the main lens, ψ denotes a refraction angle, and $\theta_1$ meets:

$$\sin\theta_1 = \frac{D}{2R}. \quad (7)$$

Preferably, a propagation mathematical model of the light propagation emergent part specifically includes:

the light ray emitted from the calibration point reaches the emergent position (p,q) of the main lens after being refracted in the main lens, and is emergent from the emergent position (p,q), and the following formula is met:

$$n_1 \sin(\theta_1 - \psi + \theta_2) = \sin\omega \quad (8),$$

where ω denotes an emergent angle, and $\theta_2$ meets:

$$\sin\theta_2 = \frac{q}{R}, \quad (9)$$

there are three imaging manners after the light ray emitted from the calibration point is emergent from the main lens, which are separately focusing on the back side of the sensor, between the sensor and the microlens array, and between the microlens array and the main lens, where when the light ray emitted from the calibration point is focused on the back side of the sensor after being emergent from the main lens, the following formula is met:

$$\frac{D_1}{d} \approx \frac{D}{f_x + d + d_{in}}, \quad (10)$$

where $D_1$ is the imaging diameter that is of the calibration point on the refocused image and that is recorded in step S3, $f_x$ is the focal length of the microlens, $d_{in}$ is the distance that is between the main lens and the microlens array and that is obtained in step S3, d is the distance between the calibration point and the sensor on a focusing plane of an image space, and the emergent position (p,q) is on a curved surface of the main lens, and the following formulas are met:

$$\tan(\omega - \theta_2) = \frac{D_1}{2d} = \frac{1}{f_x + d + d_{in} - p}; \text{ and} \quad (11)$$

$$(R - T/2 + p)^2 + q^2 = R^2; \quad (12)$$

when the light ray emitted from the calibration point is focused between the sensor and the microlens array or between the microlens array and the main lens after being emergent from the main lens, the following formula is met:

$$\frac{D_1}{d} \approx \frac{D}{f_x - d + d_{in}}, \quad (13)$$

where $D_1$ is the imaging diameter that is of the calibration point on the refocused image and that is recorded in step S3, $f_x$ is the focal length of the microlens, $d_{in}$ is the distance that is between the main lens and the microlens array and that is obtained in step S3, d is the distance between the calibration point and the sensor on a focusing plane of an image space, and the emergent position (p,q) is on the curved surface of the main lens, and the following formulas are met:

$$\tan(\omega - \theta_2) = \frac{D_1}{2d} = \frac{q}{f_x - d + d_{in} - p}; \text{ and} \quad (14)$$

$$(R - T/2 + p)^2 + q^2 = R^2. \quad (15)$$

Compared with the prior art, the beneficial effects of the present application are: In the distance estimation method based on a handheld light field camera of the present application, a shot light field image is refocused on a reference plane with a known distance, and the refocused image is equivalent to a light field image obtained by shooting after the light field camera is focused. Because the distance of the shot object (reference plane) is known, the distance between the main lens of the light field camera and the microlens array may be further acquired, and all other non-focused objects are equivalent to being imaged on the sensor after being shot by the focused light field camera. Therefore, the calibration point is set on the object (non-focused) whose distance needs to be estimated, and the distance of the object is estimated by analyzing a relationship between the imaging diameter of the calibration point on the refocused image and the distance of the calibration point. In the distance estimation method, absolute distances of all objects can be estimated by means of refocusing only once, and the method has high efficiency and greatly improves the accuracy of distance estimation, and has a good application prospect on industrial distance measurement.

DETAILED DESCRIPTION OF THE INVENTION

The following further describes the present application with reference to the accompanying drawings and in combination with preferred implementations.

Figure 1:
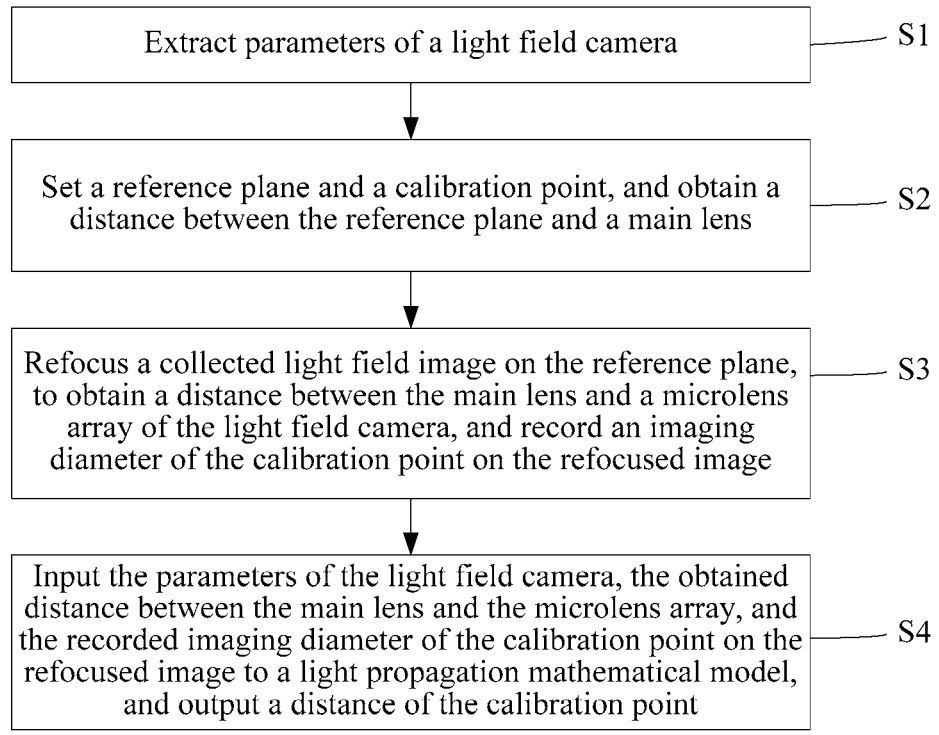
FIG. 1 is a flowchart of a distance estimation method based on a handheld light field camera according to a preferred embodiment of the present application.

As shown in FIG. 1, a preferred embodiment of the present application discloses a distance estimation method based on a handheld light field camera, including the following steps:

S1: Extract parameters of alight field camera, including a focal length, a curvature radius, a pupil diameter, and a central thickness of a main lens of the light field camera, and a focal length of a microlens array of the light field camera.

The focal length of the main lens and the focal length of the microlens array are used to obtain a distance between the main lens and the microlens array, and the curvature radius, the pupil diameter, and the central thickness of the main lens, and the focal length of the microlens array are used in a light propagation mathematical model.

S2: Set a reference plane and a calibration point, where the calibration point is set on an object whose distance needs to be estimated, and obtain a distance between the reference plane and the main lens.

The set reference plane and calibration point do not obstruct each other, the calibration point does not overlap when being imaged, and the distance between the reference plane and the main lens is used for refocusing, and is also used to obtain the distance between the main lens and the microlens array that exists after refocusing.

S3: Refocus a collected light field image on the reference plane, to obtain a distance between the main lens and the microlens array of the light field camera, and record an imaging diameter of the calibration point on the refocused image.

(1) The refocusing formula may be expressed as:

$$L_z[y_j] = \sum_{i=-c}^{c} L[v_{m-1-c+i}, y_{j+a(c-i)}], a \in R_+,  \quad (1)$$

where L denotes the light field image, $L_z$ denotes the refocused image on the reference plane z, a denotes a specific value corresponding to a focusing plane in an object space, that is, a specific value corresponding to the reference plane z in this step; y={x, y} denotes position information of the light field image, v={u,v} denotes direction information of the light field image, the subscript m denotes the resolution of an image of the microlens, that is, the number of pixels of each microlens in a one-dimensional direction, c=(m−1)/2, i is an integer with a value range of [−c,c], and the subscript j denotes coordinates in a vertical direction of the microlens, and has the value ranging from 0.

An image obtained after being refocused once is equivalent to a light field image obtained by shooting after the light field camera is focused. In this case, images of other non-focused objects on the refocused image are equivalent to being obtained by using the focused light field camera. A plane on which these non-focused objects are located is the plane z' shown in FIG. 4, and an imaging diameter of light rays emitted from the objects on the plane z' on the sensor, that is, an imaging diameter $D_1$ on the refocused image is recorded.

Figure 4:
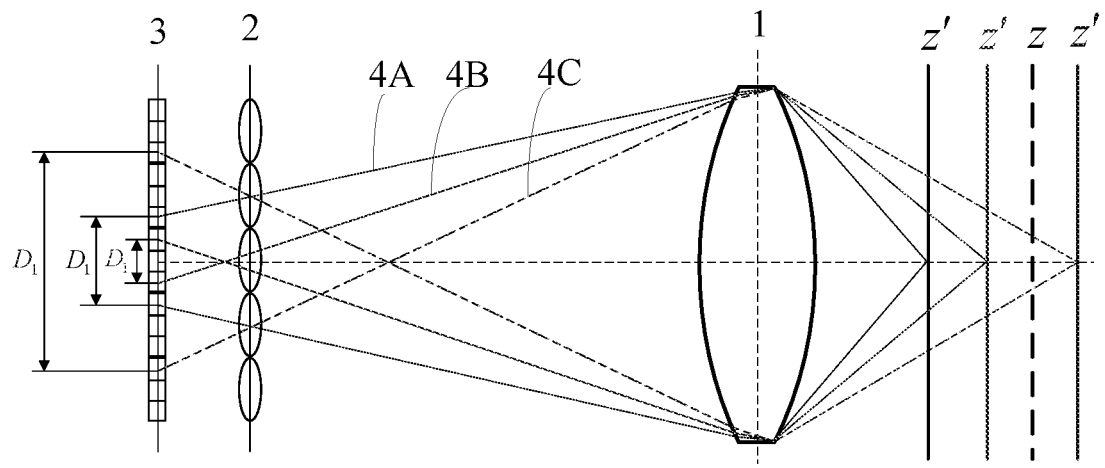
FIG. 4 is an imaging manner of a calibration point according to a preferred embodiment of the present application.
Figure 5:
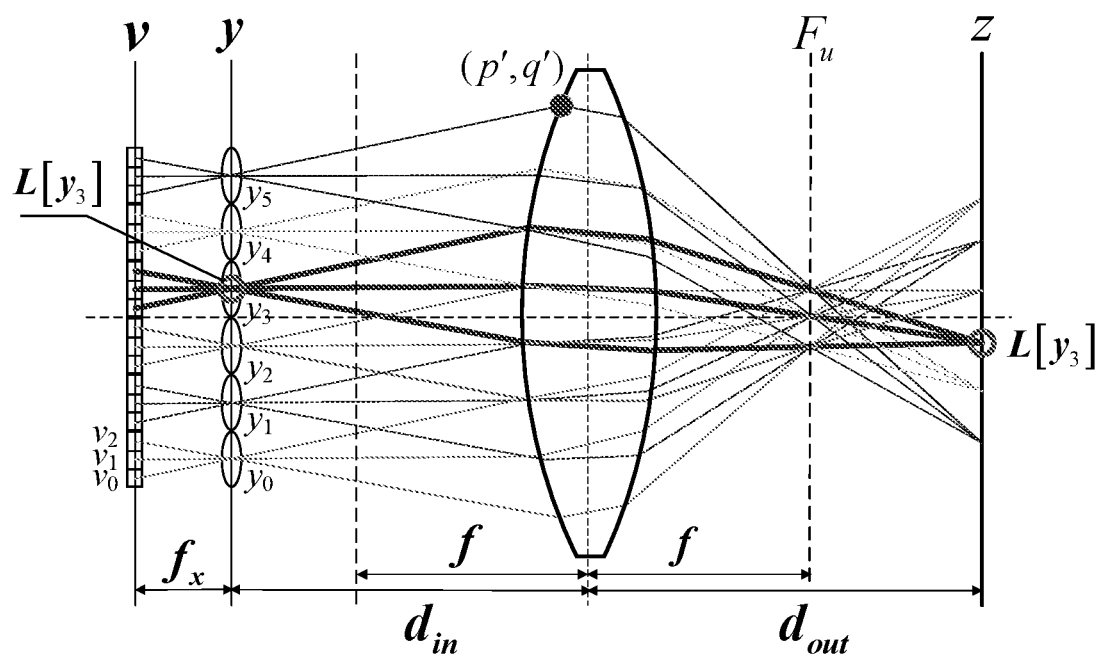
FIG. 5 is a refocused light tracing model according to a preferred embodiment of the present application.

(2) As shown in FIG. 4 and FIG. 5, because a refocusing plane is the set reference plane (plane z), a distance $d_{out}$ between the plane and a main lens 1 is known. A ray tracing method indicates that the distance between intersections on a plane $F_u$ is the baseline of the light field camera. A coordinate calculation formula of the intersections on the plane $F_u$ is:

$$F_i = m_i \times f  \quad (2),$$

where f is the focal length of the main lens 1, $m_i$ is the slope of a light ray between a sensor 3 and the main lens 1; $m_i$ may be acquired as long as the focal length and the diameter of the microlens and the number of pixels covered by each microlens are known. A calculation formula of the slope $k_i$ of the light ray emitted from the object in the object space is:

$$k_i = \frac{y'_j - F_i}{d_{out} - f},  \quad (3)$$

where $y_j'$ denotes a vertical coordinate of the object on the plane z (that is, the reference plane). Further, we may obtain, through calculation, an incident position and an emergent position (p',q') of the main lens 1 that are reached by the light ray emitted from the object. Therefore, the calculation formula of the distance $d_{in}$ between the main lens 1 and the microlens array 2 is:

$$d_{in} = \frac{q' - y_j + m_i p'}{m_i},  \quad (4)$$

where $y_j$ denotes a vertical coordinate of the center of the microlens whose subscript is j.

S4: Input the parameters of the light field camera that are extracted in step S1, the distance between the main lens and the microlens array that is obtained in step S3, and the recorded imaging diameter of the calibration point on the refocused image that is recorded in step S3 to a light propagation mathematical model, and output a distance of the calibration point.

S41: Divide the light propagation mathematical model into two parts: a light propagation incident part and a light propagation emergent part.

Figure 2:
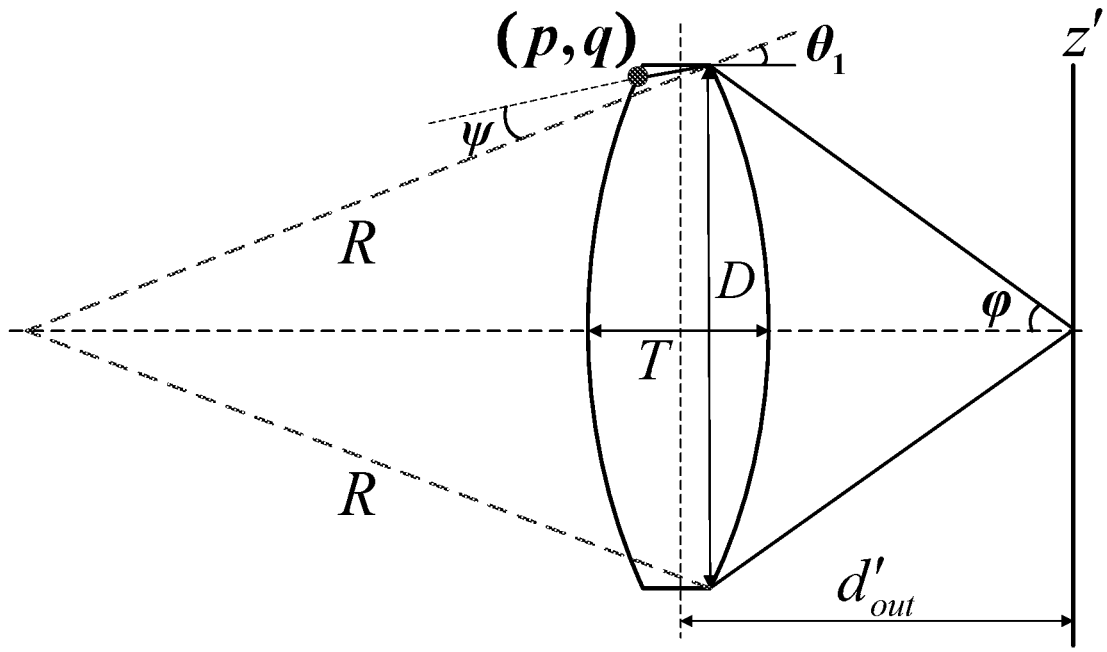
FIG. 2 is a light incident model according to a preferred embodiment of the present application.

(1) The light propagation incident part: As shown in FIG. 2, the light ray emitted from the calibration point enters the main lens at an angle $\varphi$, where $\varphi$ meets the relational expression:

$$\tan \varphi = \frac{D}{2\left(d'_{out} - T/2 + R - \sqrt{R^2 - D^2/4}\right)}, \quad (5)$$

where $d_{out}'$ denotes an axial distance between the calibration point and the center of the main lens of the light field camera; and R, D, and T are the parameters of the main lens, which separately denote the curvature radius, the pupil diameter, and the central thickness of the main lens. The light ray is refracted after entering the main lens, and a refraction formula is used to obtain:

$$n_1 \sin \psi = \sin(\varphi + \theta_1) \quad (6),$$

where $n_1$ denotes a refractive index of the main lens, $\psi$ is a refraction angle, and $\theta_1$ meets:

$$\sin \theta_1 = \frac{D}{2R}. \quad (7)$$

Figure 3:
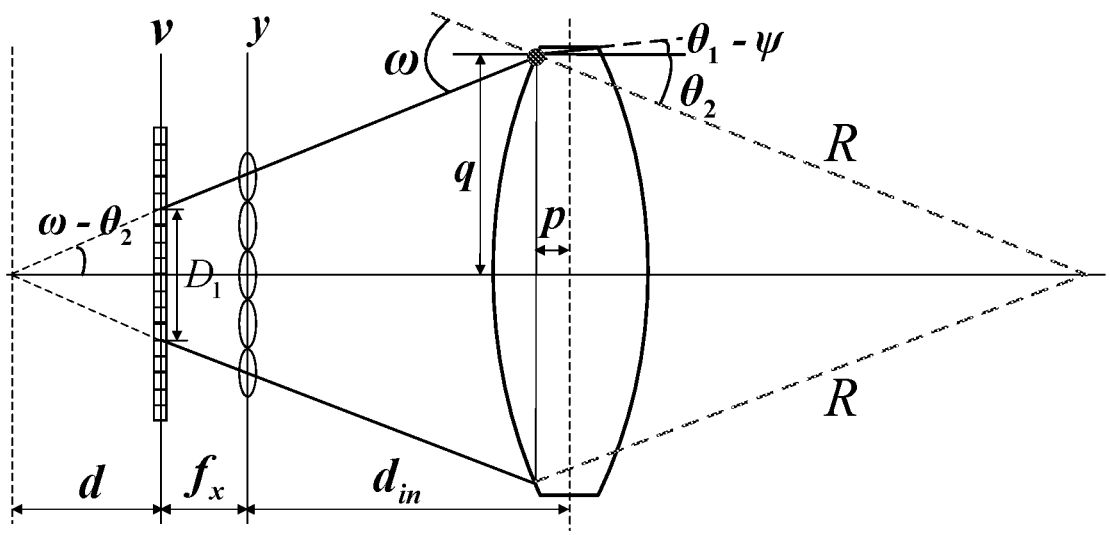
FIG. 3 is a light emergent model according to a preferred embodiment of the present application.

(2) The light propagation emergent part: As shown in FIG. 3, the light ray reaches the position (p,q) of the main lens after being refracted in the main lens, and is then emergent from the position (p,q), and the refraction formula is used again to obtain:

$$n_1 \sin(\theta_1 - \psi + \theta_2) = \sin \omega \quad (8),$$

where $\omega$ is an emergent angle, and $\theta_2$ meets:

$$\sin \theta_2 = \frac{q}{R}. \quad (9)$$

S42: There are three imaging manners after the light ray is emergent, as the three light rays 4A, 4B, and 4C shown in FIG. 4, which are respectively focused on the back side of the sensor 3 (4A), between the sensor 3 and the microlens array 2 (4B), and between the microlens array 2 and the main lens 1 (4C).

When the light ray is focused on the back side of the sensor 3, that is, in the imaging situation of the light 4A, a geometrical relationship among the main lens 1, the microlens array 2, and the sensor 3 is analyzed, and approximation is performed by using a similar triangle, to obtain:

$$\frac{D_1}{d} \approx \frac{D}{f_x + d + d_{in}}, \quad (10)$$

where $D_1$ is the imaging diameter that is of the calibration point and that is recorded in step S3; $f_x$ is the focal length of the microlens; $d_{in}$ is the distance between the main lens 1 and the microlens array 2; d is the distance between the calibration point and the sensor on a focusing plane of an image space. The emergent position (p,q) of the light is on a curved surface of the main lens, and therefore meets the following relational expressions:

$$\tan(\omega - \theta_2) = \frac{D_1}{2d} = \frac{q}{f_x + d + d_{in} - p}; \text{ and} \quad (11)$$

$$(R - T/2 + p)^2 + q^2 = R^2. \quad (12)$$

When the light ray is focused between the sensor 3 and the microlens array 2 or between the microlens array 2 and the main lens 1, that is, in the two imaging situations of the lights 4B and 4C, approximation is also performed by using a similar triangle, to obtain:

$$\frac{D_1}{d} \approx \frac{D}{f_x - d + d_{in}}; \quad (13)$$

$$\tan(\omega - \theta_2) = \frac{D_1}{2d} = \frac{q}{f_x - d + d_{in} - p}; \text{ and} \quad (14)$$

$$(R - T/2 + p)^2 + q^2 = R^2. \quad (15)$$

S43: Input the distance $d_{in}$ between the main lens of the light field camera and the microlens array, and the imaging diameter $D_1$ of the calibration point that exist after refocusing.

When the light ray is focused on the back side of the sensor 3, that is, in the imaging situation of the light 4A, the formula (10) may be used to approximately calculate d:

$$d \approx \frac{(f_x + d_{in})D_1}{D - D_1}. \quad (16)$$

The calculated d is substituted into the formula (11), and p and q are calculated in combination with the formula (12). q is substituted into the formula (9) to obtain $\theta_2$ through calculation:

$$\theta_2 = \arcsin\left(\frac{q}{R}\right). \quad (17)$$

Then, the obtained $\theta_2$ is substituted into the formula (11) to obtain $\omega$ through calculation:

$$\omega = \arctan\left(\frac{D_1}{2d}\right) + \theta_2 = \arctan\left(\frac{D_1}{2d}\right) + \arcsin\left(\frac{q}{R}\right). \quad (18)$$

Then, the formulas (7), (8), and (6) are used to sequentially obtain the angles $\theta_1$, $\psi$, and $\varphi$:

$$\theta_1 = \arcsin\left(\frac{D}{2R}\right); \quad (19)$$

$$\psi = \arcsin\left(\frac{D}{2R}\right) + \arcsin\left(\frac{q}{R}\right) - \arcsin(\sin(\omega)/n_1); \text{ and} \quad (20)$$

$$\varphi = \arcsin(n_1 \sin(\psi)) - \arcsin\left(\frac{D}{2R}\right). \quad (21)$$

Finally, the formula (5) is used to calculate an absolute distance $d_{out}'$ of the calibration point:

$$d'_{out} = \frac{D}{2\tan(\varphi)} + \sqrt{R^2 + D^2/4} - R + T/2. \quad (22)$$

When the light ray is focused between the sensor 3 and the microlens array 2 or between the microlens array 2 and the main lens 1, that is, in the two imaging situations of the lights 4B and 4C, the formula (13) may be used to approximately calculate d:

$$d \approx \frac{(f_x + d_{in})D_1}{D + D_1}. \quad (23)$$

The calculated d is substituted into the formula (14), and p and q are calculated in combination with the formula (15). Then, solution formulas of all angles are the same as the formulas (17) to (21), and finally, the formula (5) is used to calculate the absolute distance $d_{out}'$ of the calibration point.

In the distance estimation method based on a handheld light field camera of the preferred embodiments of the present application, first, a shot light field image is refocused on a reference plane with a known distance, and the focused image is equivalent to a light field image obtained by shooting after the light field camera is focused. Because the distance of the shot object (reference plane) is known, a distance between the main lens of the light field camera and the microlens array may be further acquired, and all other non-focused objects are equivalent to being imaged on the sensor after being shot by the focused light field camera. Therefore, the calibration point is set on the object (non-focused) whose distance needs to be estimated, and the distance of the object is estimated by analyzing a relationship between the imaging diameter of the calibration point on the refocused image and the distance of the calibration point. A specific implementation step is: extracting parameters of the light field camera, including a focal length, a curvature radius, a pupil diameter, and a central thickness of a main lens, and a focal length of a microlens; setting a reference plane and a calibration point, where the calibration point is set on an object whose distance needs to be estimated, and obtaining a distance between the reference plane and the main lens of the light field camera; refocusing a collected light field image on the reference plane, to obtain a distance between the main lens and a microlens array of the light field camera, and recording an imaging diameter of the calibration point on the refocused image; providing a light propagation mathematical model after analyzing an imaging system of the light field camera; and inputting the parameters of the light field camera, the imaging diameter, and the obtained distance between the main lens and the microlens array to the light propagation mathematical model, and outputting a distance of the calibration point. Because the calibration point is on the object, the estimated distance of the calibration point is the distance of the object. With the distance estimation method of the present application, absolute distances between all objects and the main lens of the light field camera can be estimated by means of refocusing once. The method has high efficiency and relatively high accuracy, and the high efficiency and accuracy provide the method of the present application with a bright application prospect on industrial distance measurement.

The foregoing content is further detailed descriptions of the present application in combination with the specific preferred implementations, and it cannot be regarded that the specific implementations of the present application are only limited to these descriptions. A person skilled in the technical field of the present application can still make several equivalent replacements or obvious variations without departing from the idea of the present application. The equivalent replacements or obvious variations have same performance or purpose, and shall fall within the protection scope of the present application.

What is claimed is:

1. A distance estimation method based on a handheld light field camera, comprising the following steps:
    S1: extracting parameters of a light field camera, comprising a focal length, a curvature radius, a pupil diameter, and a central thickness of a main lens of the light field camera, and a focal length of a microlens array of the light field camera;
    S2: setting a reference plane and a calibration point, wherein the calibration point is set on an object whose distance needs to be estimated, and obtaining a distance between the reference plane and the main lens;
    S3: refocusing a collected light field image on the reference plane, to obtain a distance between the main lens and the microlens array of the light field camera, and recording an imaging diameter of the calibration point on the refocused image; and
    S4: inputting the parameters of the light field camera that are extracted in step S1, the distance between the main lens and the microlens array that is obtained in step S3, and the imaging diameter of the calibration point on the refocused image that is recorded in step S3 to a light propagation mathematical model, and outputting a distance of the calibration point.

2. The distance estimation method according to claim 1, wherein the reference plane and the calibration point set in step S2 do not obstruct each other, and the calibration point does not overlap when being imaged.

3. The distance estimation method according to claim 1, wherein step S3 specifically comprises refocusing the collected light field image on the reference plane by using the following formula:

$$L_z[y_j] = \sum_{i=-c}^{c} L[v_{m-1-c+i}, y_{j+a(c-i)}], a \in R_+, \quad (1)$$

wherein L denotes the light field image, $L_z$ denotes the refocused image on the reference plane z, a denotes a specific value corresponding to the reference plane z; y={x, y} denotes position information of the light field image, v={u,v} denotes direction information of the light field image, the subscript m denotes the number of pixels of each microlens in a one-dimensional direction, c=(m−1)/2, i is an integer with a value range of [−c,c], and the subscript j denotes coordinates of the microlens in a vertical direction.

4. The distance estimation method according to claim 3, wherein the step of obtaining a distance between the main lens and the microlens array in step S3 specifically comprises:
    using a ray tracing method to obtain a coordinate calculation formula of intersections on a plane $F_u$:

$$F_i = m_i \times f \quad (2),$$

wherein the distance between the intersections on the plane $F_u$ is the baseline of the light field camera, f is the focal length of the main lens, and $m_i$ is the slope of a light ray between a sensor and the main lens of the light field camera;

a calculation formula of the slope $k_i$ of a light ray emitted from the object in an object space is:

$$k_i = \frac{y'_j - F_i}{d_{out} - f}, \quad (3)$$

wherein $y'_j$ denotes a vertical coordinate of the object on the reference plane, and $d_{out}$ denotes the distance between the reference plane and the main lens; and obtaining, through calculation according to the formula (3), an incident position and an emergent position (p',q') of the main lens that are reached by the light ray emitted from the object, and obtaining, through calculation according to the emergent position (p',q'), the distance $d_{in}$ between the main lens and the microlens array:

$$d_{in} = \frac{q' - y_j + m_i p'}{m_i}, \quad (4)$$

wherein $y_j$ denotes a vertical coordinate of the center of the microlens whose subscript is j.

5. The distance estimation method according to claim 1, wherein the light propagation mathematical model in step S4 specifically comprises a light propagation incident part and a light propagation emergent part.

6. The distance estimation method according to claim 5, wherein a propagation mathematical model of the light propagation incident part specifically comprises:

the light ray emitted from the calibration point enters the main lens at an angle φ, wherein φ meets the relational expression:

$$\tan\varphi = \frac{D}{2\left(d'_{out} - T/2 + R - \sqrt{R^2 - D^2/4}\right)}, \quad (5)$$

wherein $d_{out}'$ denotes an axial distance between the calibration point and the center of the main lens, R denotes the curvature radius of the main lens, D denotes the pupil radius of the main lens, T denotes the central thickness of the main lens, and the light ray emitted from the calibration point is refracted after entering the main lens, and the following formula is met:

$$n_1 \sin\psi = \sin(\varphi + \theta_1) \quad (6),$$

wherein $n_1$ denotes a refractive index of the main lens, ψ denotes a refraction angle, and $\theta_1$ meets:

$$\sin\theta_1 = \frac{D}{2R}. \quad (7)$$

7. The distance estimation method according to claim 6, wherein a propagation mathematical model of the light propagation emergent part specifically comprises:

the light ray emitted from the calibration point reaches the emergent position (p,q) of the main lens after being refracted in the main lens, and is emergent from the emergent position (p,q), and the following formula is met:

$$n_1 \sin(\theta_1 - \psi + \theta_2) = \sin\omega \quad (8)$$

wherein ω denotes an emergent angle, and $\theta_2$ meets:

$$\sin\theta_2 = \frac{q}{R}; \quad (9)$$

there are three imaging manners after the light ray emitted from the calibration point is emergent from the main lens, which are separately focusing on the back side of the sensor, between the sensor and the microlens array, and between the microlens array and the main lens, wherein when the light ray emitted from the calibration point is focused on the back side of the sensor after being emergent from the main lens, the following formula is met:

$$\frac{D_1}{d} \approx \frac{D}{f_x + d + d_{in}}, \quad (10)$$

wherein $D_1$ is the imaging diameter that is of the calibration point on the refocused image and that is recorded in step S3, $f_x$ is the focal length of the microlens, $d_{in}$ is the distance that is between the main lens and the microlens array and that is obtained in step S3, d is the distance between the calibration point and the sensor on a focusing plane of an image space, and the emergent position (p,q) is on a curved surface of the main lens, and the following formulas are met:

$$\tan(\omega - \theta_2) = \frac{D_1}{2d} = \frac{q}{f_x + d + d_{in} - p}; \text{ and} \quad (11)$$

$$(R - T/2 + p)^2 + q^2 = R^2; \quad (12)$$

when the light ray emitted from the calibration point is focused between the sensor and the microlens array or between the microlens array and the main lens after being emergent from the main lens, the following formula is met:

$$\frac{D_1}{d} \approx \frac{D}{f_x - d + d_{in}}, \quad (13)$$

wherein $D_1$ is the imaging diameter that is of the calibration point on the refocused image and that is recorded in step S3, $f_x$ is the focal length of the microlens, $d_{in}$ is the distance that is between the main lens and the microlens array and that is obtained in step S3, d is the distance between the calibration point and the sensor on a focusing plane of an image space, and the emergent position (p,q) is on the curved surface of the main lens, and the following formulas are met:

$$\tan(\omega - \theta_2) = \frac{D_1}{2d} = \frac{q}{f_x - d + d_{in} - p}; \text{ and} \quad (14)$$

$$(R - T/2 + p)^2 + q^2 = R^2. \quad (15)$$

\* \* \* \* \*